Nov. 5, 1968   W. ZAPP   3,409,343
MAGNIFYING VIEWING DEVICE
Filed Oct. 23, 1965
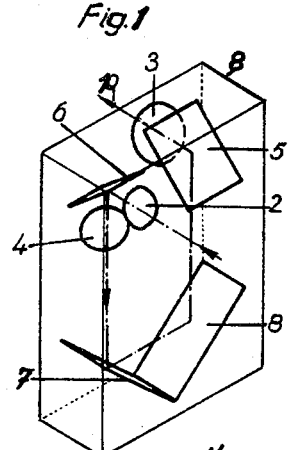
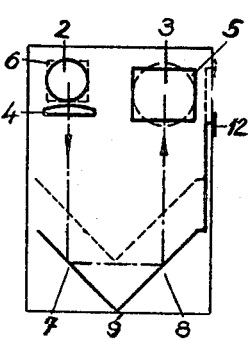
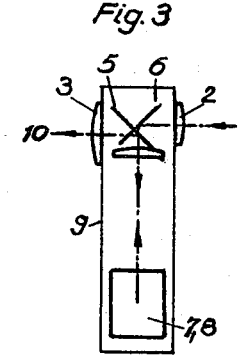
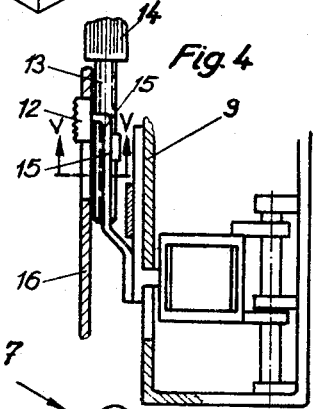
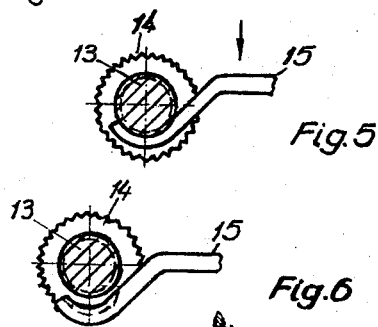
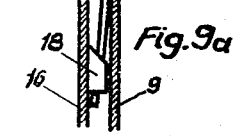
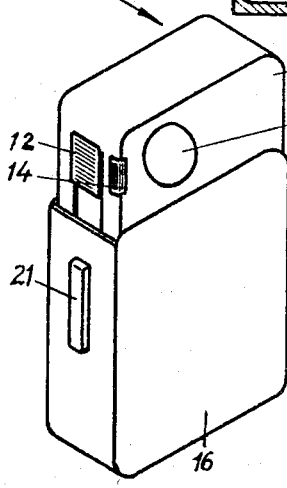
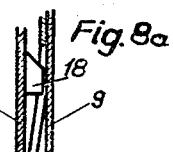
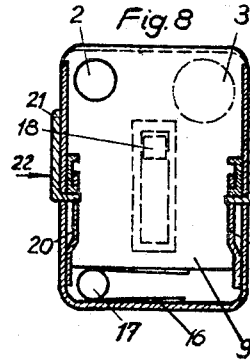
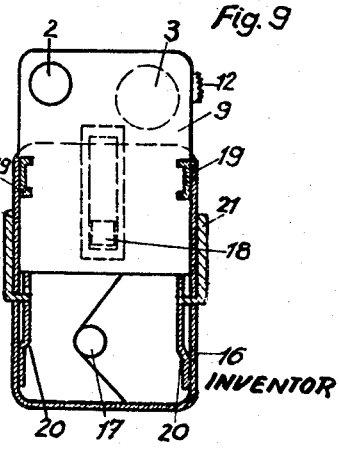

United States Patent Office 3,409,343
Patented Nov. 5, 1968

3,409,343
MAGNIFYING VIEWING DEVICE
Walter Zapp, Oberegg, Switzerland
Filed Oct. 23, 1965, Ser. No. 503,142
4 Claims. (Cl. 350—51)

ABSTRACT OF THE DISCLOSURE

A viewing device in which a sheath bearing an eyepiece and objective lens is extendible from a casing. An optical system perpendicular to the axes of the lenses is provided with an adjustment for focusing. The eyepiece and objective lenses are concealed within the casing but are exposed when the sheath is extended.

---

This invention relates to a magnifying viewing device, which is very small and light and yet meets all requirements and is superior to the known devices of this kind.

All known viewing devices used as telescopes or the like have their main dimension in the viewing direction. Moreover, their centers of gravity are in or near the line of sight of the viewer and at a distance from the point where the telescope is supported against the portions of the head surrounding the eye. This results in an unstable connection between the eye and the telescope. In case of fatigue of the hand which is holding the telescope, the center of gravity of the telescope oscillates about the point of support so that the telescope shakes. The image then also appears to be shaking, the more so that greater the magnifying power of the telescope. This fact limits the magnifying power of hand telescopes which can be used as a mater of practicality.

A viewing device according to the invention includes as optical elements an objective lens, an eyepiece, a field lens and four image-erecting mirrors, which deflect the rays in the device four times. In this viewing device, the above-mentioned disadvantages are avoided in that the rays are deflected by the mirrors in a U-shaped path and out of the plane of said path and the viewing direction is at right angles to said plane.

This enables the incorporation of the components into a flat prismatic housing, which may be carried in a pocket and which has major faces at right angles to the viewing direction.

When the device is used, this housing is held with a hand to be disposed beside the nose in such a manner that its center of gravity is in a stable position substantially below the eye of the viewer. For this reason, the device cannot vibrate or shake even when the hand is fatigued because the center of gravity is as low as possible in the normal position of the device. As a result, the practical limit of the magnifying power of a telescopic viewing device according to the invention is much higher than with all known telescopes.

The above-described ray path in the viewing device according to the invention has the further advantage that the housing which contains the optical elements can be held in a protective sheath by detent means against the action of a spring which upon release of the detent means moves that part of the housing which contains the object lens and the eyepiece telescopically out of the sheath. Thus, all external optical parts of the device can be protected at the same time by a one-hand operation pushing the housing into the sheath, and the device can be made ready for use by releasing the detent. The release of the detent is suitably affected by keys, which are mounted at the narrow side of the sleeve.

A further advantage of the ray path in the device according to the invention is due to the fact that the two limbs of the U can be displaced parallel to themselves within a large range by an adjustment of the pair of mirrors which defines the bight of the U. In this case, the optically effective extension is twice the mechanical displacement of the mirrors. As a result, the device can be selectively used as a telescope and as a telescopic magnifier. Different from ordinary magnifiers having the same magnifying power, the viewing device according to the invention when used as a magnifier has the important advantage that the viewing distance is about six times larger (in the example 180 mm.), which corresponds to the normal range of close vision.

The pair of mirrors are suitably displaced by a push button slider, which has an extension, which protrudes into the device and in its released position interengages with a screw, which is rotatably mounted in the housing and is operable to effect a fine adjustment of the pair of mirrors by a milled or knurled wheel, which protrudes out of the housing.

When the device is viewed in its viewing direction, the adjusting device is preferably on the right at the side wall of the housing so that the adjusting device can be operated by a finger of the hand which holds the viewing device in position in front of the eye. This arrangement enables a complete operation of the device with only one hand.

In the drawing which shows by way of example and diagrammatically, a preferred embodiment of the invention:

FIG. 1 is a perspective diagrammatic view showing the path of rays in the inner housing;

FIG. 2 is a diagrammatic elevation showing the path of rays as viewed in the viewing direction of the device;

FIG. 3 is a diagrammatic elevation of the path of rays as viewed at right angles to the viewing direction of the device;

FIG. 4 shows the adjusting device on enlarged scale;

FIG. 5 is a sectional view taken along line V—V of FIG. 4 and shows the adjusting device in position for a fine adjustment;

FIG. 6 is a sectional view of FIG. 5 in position for a coarse adjustment;

FIG. 7 is a perspective view approximately true to size and shows the device extended in position for use;

FIG. 8 is an elevation showing the device according to FIG. 7 with the inner housing retracted and one of the major walls of the sheath removed;

FIG. 8a shows a detail of FIG. 8.

FIG. 9 shows the device of FIG. 8 in position for use, with the inner housing extended; and FIG. 9a shows a detail of FIG. 9.

As appears in FIG. 2, the mirrors 7 and 8 can be displaced in parallel to themselves in the housing 9. This is effected by a push button slider 12. Mirrors 5 and 6 are respectively associated with objective 3 and eyepiece 2. Field lens 4, serving a conventional purpose, is located between mirrors 6 and 7.

For a coarse adjustment, the push button slider 12 is depressed (FIG. 6) and can then be displaced parallel to the longitudinal direction of the housing 9 which is generally a parallelepiped structure. The pair of mirrors 7, 8 follows this movement. When the push button slider 12 is not depressed, an extension 15 of the push button slider 12 is urged by a spring into the threads of the screw 13 (FIG. 5). A fine adjustment of the mirrors 7, 8 can then be effected by a rotation of the milled or knurled wheel 14 and the threaded rod or screw 13.

The housing 9 is fitted in the sheath, which is also a generally parallelepiped structure 16 and is urged outwardly, by a spring 17, against a stop 18. In this position, the eyepiece 2 and the objective lens 3 protrude above the sheath (FIG. 9). These lenses are in parallel planes spaced apart by the thickness dimension of the housing which is substantially less than the width and height dimensions thereof. In the retracted position (FIG. 8) the housing 9 is held in the sheath 16 by two detent members 20 engaging locking elements 19. The resilient detent members 20 can be released from locking elements 19 by compression in the direction of the arrows 22 of the two keys 21 connected to said detent members. This results in a release of the detent members 20 so that the housing 9 springs upwardly out of the sheath 16 (FIG. 9) and engages the stop 18.

The release of the housing 9 to spring out of the sheath 16 and the focusing by means of the push button 12 or the milled or knurled wheel 14 as well as the holding of the housing in position before the eye are effected with one hand. The correct holding of the device before the eye is facilitated by the fact that the devices for focusing the image (12, 14) are on the right of the viewing axis 10 (FIG. 7).

The viewing device according to the invention may alternatively be used as a magnifier although the viewing distance from the object glass is larger than with normal magnifiers.

I claim:

1. Optical apparatus comprising a housing and a sheath in nesting relation, the housing being displaceable in determinable direction relative to said sheath between retracted and extended positions, the housing and sheath being relatively flat elements having major sides extending at least approximately parallel to said direction, eyepiece and objective lenses in opposite of the major sides of said housing and having spaced parallel axes at least approximately perpendicular to said direction and to the major sides of said housing, said lenses being concealed by the sheath with the housing in retracted position and exposed with the housing in extended position, and optical means in said housing for intercepting images received in the housing via the objective lens and for transmitting magnified images from the housing via the eyepiece lens, said optical means defining a generally U-shaped optical path perpendicular to said axes, in said housing and comprising a field lens in said path at least one light-direction changing means, adjustment means to adjust the spacing between the field lens and light-direction changing means in a direction perpendicular to said axes, and a further light-direction changing means between said field lens and said eyepiece.

2. Apparatus as claimed in claim 1, wherein the adjustment means includes a rotatable threaded rod in said casing, engaging means on the first said light-direction changing means and normally engaged with said rod, said housing being provided with a slot parallel to said rod, a pushbutton slider displaceable in said slot and connected with said engaging means to disengage the latter from said rod for adjusting the relative engagement therebetween, and means on the housing to rotate the rod for fine adjustment of the light-direction changing means.

3. Apparatus as claimed in claim 1, comprising spring means for urging the housing and sheath apart, locking means for holding the housing in retracted position against the force of said spring means, said locking means being located between the major sides of the sheath and stop means effective to limit movement of the housing out of said sheath, said lenses being positioned adjacent an extremity of said housing, which extremity is extended from said sheath when the housing is in extended position.

4. Apparatus as claimed in claim 1, wherein said light-direction changing means is a V-shaped mirror, and wherein said mirror is mounted in said housing at a position remote from the lenses and wherein said optical means comprises oppositely inclined mirrors in the housing in intercepting relation with the axes of the lenses and adapted with the first said mirrors to establish said optical path between said eyepiece and objective lenses, one of said mirrors being positioned between the eyepiece and field lenses the axes of which are at right angles to each other, the housing and sheath having thickness dimensions which are substantially less than the height and width dimensions thereof and the lenses being positioned in parallel planes separated, at least approximately, by the thickness dimension of the housing.

References Cited

UNITED STATES PATENTS

| | | | |
|---|---|---|---|
| 715,793 | 12/1902 | Harvey | 350—64 |
| 835,625 | 11/1906 | Konig | 350—51 |
| 1,897,608 | 2/1933 | Cover | 350—51 X |
| 2,169,548 | 8/1939 | Zapp | 95—31 |
| 2,277,065 | 3/1942 | Bock | 350—34 |
| 2,481,409 | 9/1949 | Glauser | 350—53 X |
| 2,537,962 | 1/1951 | Brown | 350—53 |
| 2,704,009 | 3/1955 | Haeseler | 350—51 X |
| 2,808,757 | 10/1957 | Scott | 350—305 X |

FOREIGN PATENTS

| | | |
|---|---|---|
| 858,171 | 1/1961 | Great Britain. |

DAVID SCHONBERG, *Primary Examiner.*

P. R. GILLIAM, *Assistant Examiner.*